(12) United States Patent
Godwin et al.

(10) Patent No.: US 10,812,642 B2
(45) Date of Patent: Oct. 20, 2020

(54) AUXILIARY RADIO COMMUNICATION SYSTEM

(71) Applicant: RF Solutions, LLC, South Hackensack, NJ (US)

(72) Inventors: Chris Godwin, New Rochelle, NY (US); William Share, West New York, NJ (US)

(73) Assignee: RF Solutions, LLC, South Hackensack, NJ (US)

( * ) Notice: Subject to any disclaimer, the term of this patent is extended or adjusted under 35 U.S.C. 154(b) by 0 days.

(21) Appl. No.: 16/244,946

(22) Filed: Jan. 10, 2019

(65) Prior Publication Data

US 2019/0222687 A1    Jul. 18, 2019

Related U.S. Application Data

(60) Provisional application No. 62/616,934, filed on Jan. 12, 2018, provisional application No. 62/616,830, filed on Jan. 12, 2018.

(51) Int. Cl.
| | |
|---|---|
| *H04M 1/06* | (2006.01) |
| *H04B 17/17* | (2015.01) |
| *H04L 1/00* | (2006.01) |
| *H04L 1/18* | (2006.01) |
| *H04M 1/725* | (2006.01) |

(52) U.S. Cl.
CPC ............ *H04M 1/06* (2013.01); *H04B 17/17* (2015.01); *H04L 1/0073* (2013.01); *H04L 1/189* (2013.01); *H04M 1/7253* (2013.01); *H04M 1/72538* (2013.01); *H04M 1/72513* (2013.01); *H04M 1/72536* (2013.01)

(58) Field of Classification Search
CPC ....... H04B 17/17; H04L 1/0073; H04L 1/189; H04M 1/06; H04M 1/7253; H04M 1/72538; H04M 1/72513; H04M 1/72536
USPC .......................................... 379/447; 455/7, 8
See application file for complete search history.

(56) References Cited

U.S. PATENT DOCUMENTS

| | | | | |
|---|---|---|---|---|
| 3,651,379 A | * | 3/1972 | Moisand | H02H 5/042 361/106 |
| 5,010,565 A | * | 4/1991 | Nash | H02J 7/0042 455/462 |
| 2003/0049198 A1 | * | 3/2003 | Brown | C01F 7/148 423/625 |

(Continued)

*Primary Examiner* — Melur Ramakrishnaiah
(74) *Attorney, Agent, or Firm* — Instrinsic Law Corp.

(57) ABSTRACT

An auxiliary radio communications system includes a dispatch radio console (DRC), a plurality of antennas, and a radio amplification unit (RAU). The RAU includes first and second repeaters that are in communication with an RAU interconnect board. The first and second RF repeaters receive first and second communication signals from the RAU interconnect board, respectively, and retransmit them to the antennas and to the DRC. The antennas rebroadcast the first and second communication signals over first and second communication channels, respectively. The DRC can include first and second dispatch control modules (DCMs) that receive the first and second communication signals, respectively. The first and second communication signals can originate from the first and second DCMs, respectively, from a first handheld radio tuned to the first communication channel, and/or from a second handheld radio tuned to the second communication channel.

25 Claims, 14 Drawing Sheets

(56) References Cited

U.S. PATENT DOCUMENTS

| | | | | |
|---|---|---|---|---|
| 2003/0173830 | A1* | 9/2003 | Smith | H05K 7/2019 |
| | | | | 307/117 |
| 2009/0267703 | A1* | 10/2009 | May | H03H 7/40 |
| | | | | 333/32 |
| 2010/0044460 | A1* | 2/2010 | Sauzade | B05B 17/0646 |
| | | | | 239/102.2 |
| 2010/0068992 | A1* | 3/2010 | Masoian | H04B 7/2606 |
| | | | | 455/8 |
| 2012/0258758 | A1* | 10/2012 | Overduin | H04B 1/401 |
| | | | | 455/518 |
| 2018/0139331 | A1* | 5/2018 | Ahmed | H04M 11/04 |
| 2019/0104044 | A1* | 4/2019 | Yang | H04L 41/0631 |

* cited by examiner

AUXILIARY RADIO COMMUNICATION SYSTEM

CROSS-REFERENCE TO RELATED APPLICATIONS

This application claims priority to U.S. Provisional Application No. 62/616,934, titled "Auxiliary Radio Communication System," filed on Jan. 12, 2018, and to U.S. Provisional Application No. 62/616,830, titled "System and Method Having Communication Console and Handset," filed on Jan. 12, 2018, which are hereby incorporated by reference.

TECHNICAL FIELD

The present application relates generally to radio communications systems for emergency responders, such as firefighters.

BACKGROUND

After the communications failures of firefighters in the World Trade Center on 9/11, New York City mandated the installation of auxiliary radio communication systems (ARCs) in all newly-constructed high-rise buildings. The requirement for ARCs was codified in the New York City Building Code (e.g., sections 403.4.4 and 907.2.13.2).

It would be desirable to provide an ARC that meets or exceeds these requirements, and that may be easily adapted to meet the needs of first responders in other localities.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

An aspect of the invention is directed to an apparatus comprising: a logic board comprising a microprocessor; a plurality of sensor inputs in electrical communication with the microprocessor; and a display screen in electrical communication with the microprocessor. The apparatus further comprises an interconnect board that receives first and second communication signals, the interconnect board in electrical communication with the logic board; a first RF repeater in electrical communication with the interconnect board and with the logic board, the first RF repeater receiving the first communication signals from the interconnect board; and a second RF repeater in electrical communication with the interconnect board and with the logic board, the second RF repeater receiving the second communication signals from the interconnect board, wherein: the first RF repeater retransmits the first communication signals to a plurality of antennas to broadcast over a first communication channel, and the second RF repeater retransmits the second communication signals to the plurality of antennas to broadcast over a second communication channel.

In one or more embodiments, the first RF repeater retransmits the first communication signals to a first dispatch control module that includes a first handset; and the second RF repeater retransmits the second communication signals to a second dispatch control module that includes a second handset. In one or more embodiments, the first and second dispatch control modules are disposed in a common dispatch radio console.

In one or more embodiments, the apparatus further comprises a plurality of thermistors and the plurality of sensor inputs includes thermistor inputs, the thermistor inputs receiving output signals from the plurality of thermistors. In one or more embodiments, the apparatus further comprises a liquid presence sensor and the plurality of sensor inputs includes a liquid presence sensor input, the liquid presence sensor input receiving an output signal from the liquid presence sensor. In one or more embodiments, the apparatus further comprises a fan fail sensor in electrical communication with a cooling fan, and the plurality of sensor inputs includes a fan fail sensor input, the fan fail sensor input receiving an output signal from the fan fail sensor. In one or more embodiments, the logic board includes an RF power reflection sense circuit in electrical communication with an RF power meter. In one or more embodiments, the RF power meter is in electrical communication with at least one of the antennas.

In one or more embodiments, the interconnect board receives first handheld radio communication signals from a first antenna, the first RF repeater retransmits the first handheld radio communication signals to the antennas, to broadcast over the first communication channel, and to a first dispatch control module, the interconnect board receives second handheld radio communication signals from a second antenna, and the second RF repeater retransmits the second handheld radio communication signals to the antennas, to broadcast over the second communication channel, and to a second dispatch control module. In one or more embodiments, the first and second dispatch control modules are disposed in a common dispatch radio console.

In one or more embodiments, the apparatus further comprises a rectifier that converts an input AC power to an output DC power, the output DC power output electrically coupled to the first and second interconnect boards, to the first and second RF repeaters, and to the logic board. In one or more embodiments, the interconnect board is a first interconnect board and the apparatus further comprises a second interconnect board that receives third and fourth communication signals, the second interconnect board in electrical communication with the logic board and with the first and second RF repeaters, wherein the first RF repeater retransmits the third communication signals to the antennas to broadcast over the first communication channel, and the second RF repeater retransmits the fourth communication signals to the antennas to broadcast over the second communication channel.

In one or more embodiments, the logic board further comprises a heartbeat monitor that sends a test signal to the first and second RF repeaters and to the antennas to test the apparatus.

Another aspect of the invention is directed to an auxiliary radio communications system comprising: a dispatch radio console comprising first and second dispatch control modules, the first dispatch control module including a first handset that sends and receives first communication signals, the second dispatch control module including a second handset that sends and receives second communication signals; a plurality of antennas; a radio amplification unit comprising: an RAU logic board comprising a microprocessor; and a display screen in electrical communication with the microprocessor; an RAU interconnect board that receives first and second communication signals, the RAU interconnect board in electrical communication with the RAU logic board; a first RF repeater in electrical communication with the RAU interconnect board and with the RAU logic board; and a second RF repeater in electrical communication with the RAU interconnect board and with the RAU logic board, wherein: the first RF repeater retransmits the first communication signals to the antennas, the second RF repeater retransmits the second communication signals to the antennas, and the antennas broadcast the first and second communication signals over the first and second communication channels, respectively.

In one or more embodiments, the dispatch radio console further comprises: a DRC logic board that includes a microprocessor, the DRC logic board in electrical communication with the first and second dispatch control modules; and a DRC interconnect board in electrical communication with the RAU interconnect board, the DRC logic board, and the first and second dispatch control modules. In one or more embodiments, each of the first and second dispatch control modules includes a controller board and a passive board. In one or more embodiments, each passive board includes: a handset interface in electrical communication with the corresponding handset to provide and receive input and output signals, respectively; a hook switch interface in electrical communication with the corresponding handset to receive an off hook signal when the handset is off hook; audio interfaces including a monitor-and-transmit switch and a volume controller; and status lights that indicate a status of the corresponding communication channel. In one or more embodiments, the DRC logic board further includes a handset off-hook monitor in electrical communication with the hook switch interface and with an off-hook status light.

In one or more embodiments, the DRC logic board further includes a heartbeat monitor that communicates with the radio amplification unit to test the dispatch radio console. In one or more embodiments, the DRC interconnect board and the RAU interconnect board are electrically coupled by a cable disposed in a pathway having at least a 2-hour fire rating. In one or more embodiments, the RAU logic board further comprises a heartbeat monitor that sends a test signal to the first and second RF repeaters and to the antennas to test the apparatus. In one or more embodiments, the RAU logic board further comprises an RF power reflection sense circuit in electrical communication with an RF power meter, the RF power meter in electrical communication with at least one of the antennas.

In one or more embodiments, the RAU interconnect board receives first handheld radio communication signals from a first antenna, the first RF repeater retransmits the first handheld radio communication signals to the plurality of antennas and to the first dispatch control module, the RAU interconnect board receives second handheld radio communication signals from a second antenna, the second RF repeater retransmits the second handheld radio communication signals to the plurality of antennas and to the second dispatch control module, and the antennas broadcast the first and second handheld radio communication signals over the first and second channels, respectively.

In one or more embodiments, the RAU interconnect board is a first RAU interconnect board and the apparatus further comprises a second RAU interconnect board that receives third and fourth communication signals, the second RAU interconnect board in electrical communication with the RAU logic board and with the first and second RF repeaters, wherein the first RF repeater retransmits the third communication signals to the antennas, the second RF repeater retransmits the fourth communication signals to the antenna, and the antennas broadcast the third and fourth communication signals over the first and second channels, respectively.

In one or more embodiments, the first and second channels correspond to first and second radio frequency pairs, respectively.

BRIEF DESCRIPTION OF THE DRAWINGS

Reference is made to the following detailed description in connection with the accompanying drawings, in which.

DETAILED DESCRIPTION

An in-building auxiliary radio communications system includes a radio amplification unit that is operatively coupled to a dispatch radio console and to antennas located in a multi-story building. The antennas are configured to broadcast over first and second communication channels to support two independent conversations among and between a first group of emergency personnel, carrying wireless devices such as radios tuned to the first communication channel, and a first dispatcher and a second group of emergency personnel, carrying wireless devices such as radios tuned to the second communication channel, and a second dispatcher.

The radio amplification unit receives first communication signals from one of the antennas or from a first dispatch control module in the dispatch radio console, and re-transmits the first communication signals to all antennas and to the first dispatch control module to ensure that all relevant devices and parties receive the first communication signals. The antennas broadcast the first communication signals over the first communication channel.

Likewise, the radio amplification unit receives second communication signals from one of the antennas or from a second dispatch control module in the dispatch radio console, and re-transmits the second communication signals to all antennas and to the second dispatch control module to ensure that all relevant devices and parties receive the second communication signals. The antennas broadcast the second communication signals over the second communication channel.

In some embodiments, the dispatch control module can be configured in a first configuration on a first side of the dispatch radio console or in a second configuration on a second side of the dispatch radio console.

Figure 1:
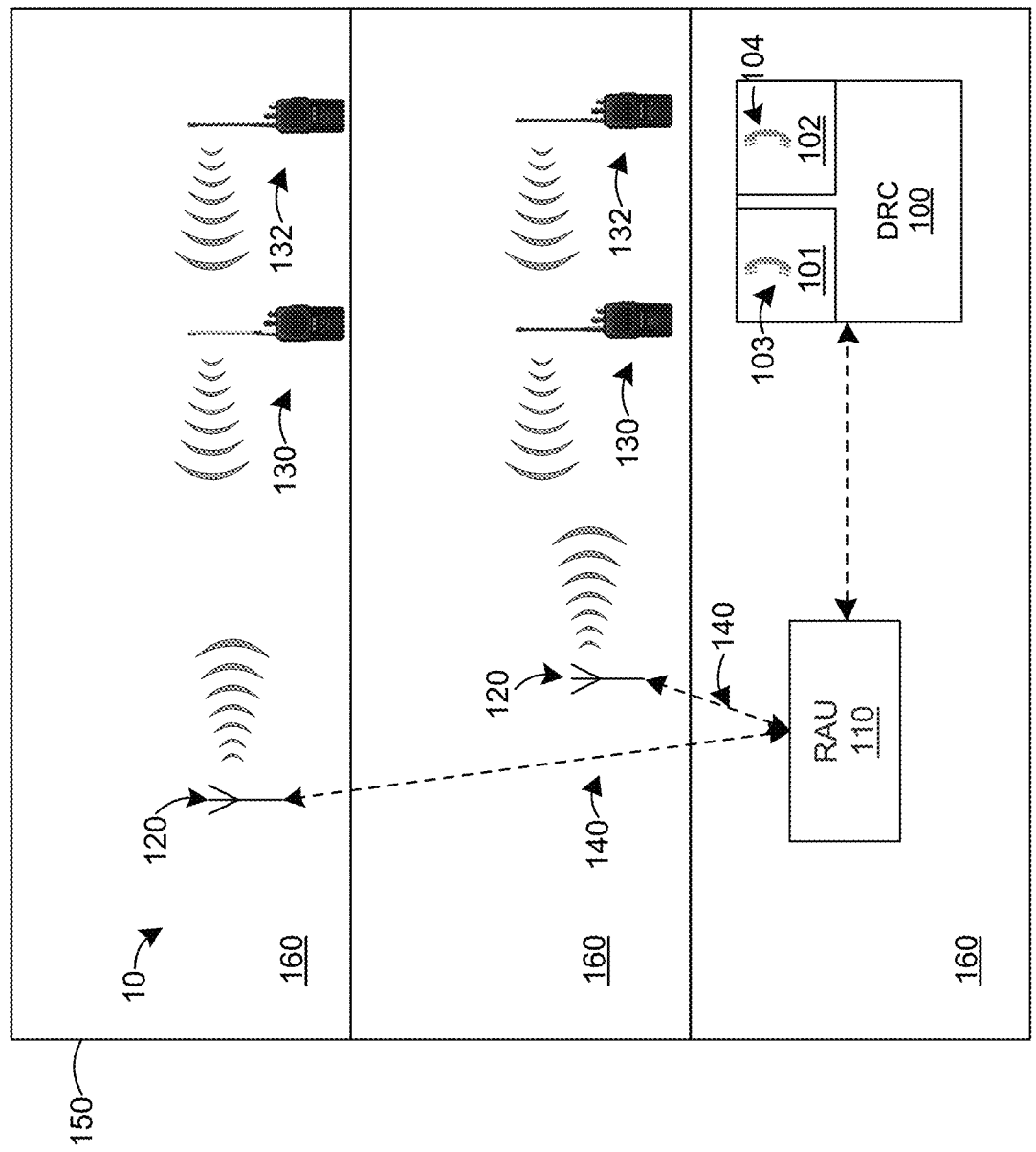
FIG. 1 is a block diagram of an in-building auxiliary radio communications system 10 according to one or more embodiments.

FIG. 1 is a block diagram of an in-building auxiliary radio communications system (ARC) 10 according to one or more embodiments. ARC 10 includes a dispatch radio console (DRC) 100, a repeater amplification unit (RAU) 110, and antennas 120. ARC 10 is configured and arranged in a structure 150, such as a high-rise building, to enhance wireless (e.g., radio) communication among emergency responders (e.g., firefighters) and between emergency responders and one or more on-site dispatchers. ARC 10 includes two communication channels that allow the emergency responders and the on-site dispatcher(s) to engage in two independent conversations based on the radio frequency that the emergency responders and on-site dispatcher(s) are tuned into. As used herein, a "channel" refers to a specific pair of frequencies assigned and authorized for ARC system use. In a channel, one frequency is assigned for transmitting signals and the other frequency is assigned for receiving signals.

The DRC 100 includes first and second dispatch control modules (DCMs) 101, 102 that allow the on-site dispatcher (s) to communicate (e.g., using handsets 103, 104) with the emergency responders over the respective communication channel and frequency. The DRC 100 can function as a command center for the on-site emergency responders. Communication signals from each DCM are sent to RAU 110, which retransmits the communications signals to each antenna 120 in the structure one or more communication lines 140. One or more antennas 120 can be located on each floor 160 of the structure, and each floor can have at least one antenna 120. The antennas 120 broadcast first communication signals received from the first DCM on a first frequency and second communication signals received from the second DCM on a second frequency. Radios 130 held by a first subset of the emergency workers are tuned to the first frequency and receive the first communication signals. Radios 132 held by a second subset of the emergency workers are tuned to the second frequency and receive the second communication signals.

Conversely, communication signals sent from a radio 130 over the first frequency are received by an antenna 120 within range of the radio 130 and sent to RAU 110 over a communication line. RAU 110 then re-transmits the communications signals back to each antenna 120 (which rebroadcasts the communications signals on the first frequency) and to DRC 100. Likewise, communication signals sent from a radio 132 over the second frequency are received by an antenna 120 within range of the radio 132 and sent to RAU 110 over a communication line. RAU 110 then re-transmits the communications signals back to each antenna 120 (which re-broadcasts the communications signals on the second frequency) and to DRC 100. Thus, the ARC 10 enhances and provides redundancy to the radio communications of the emergency workers within the structure.

Figure 2:
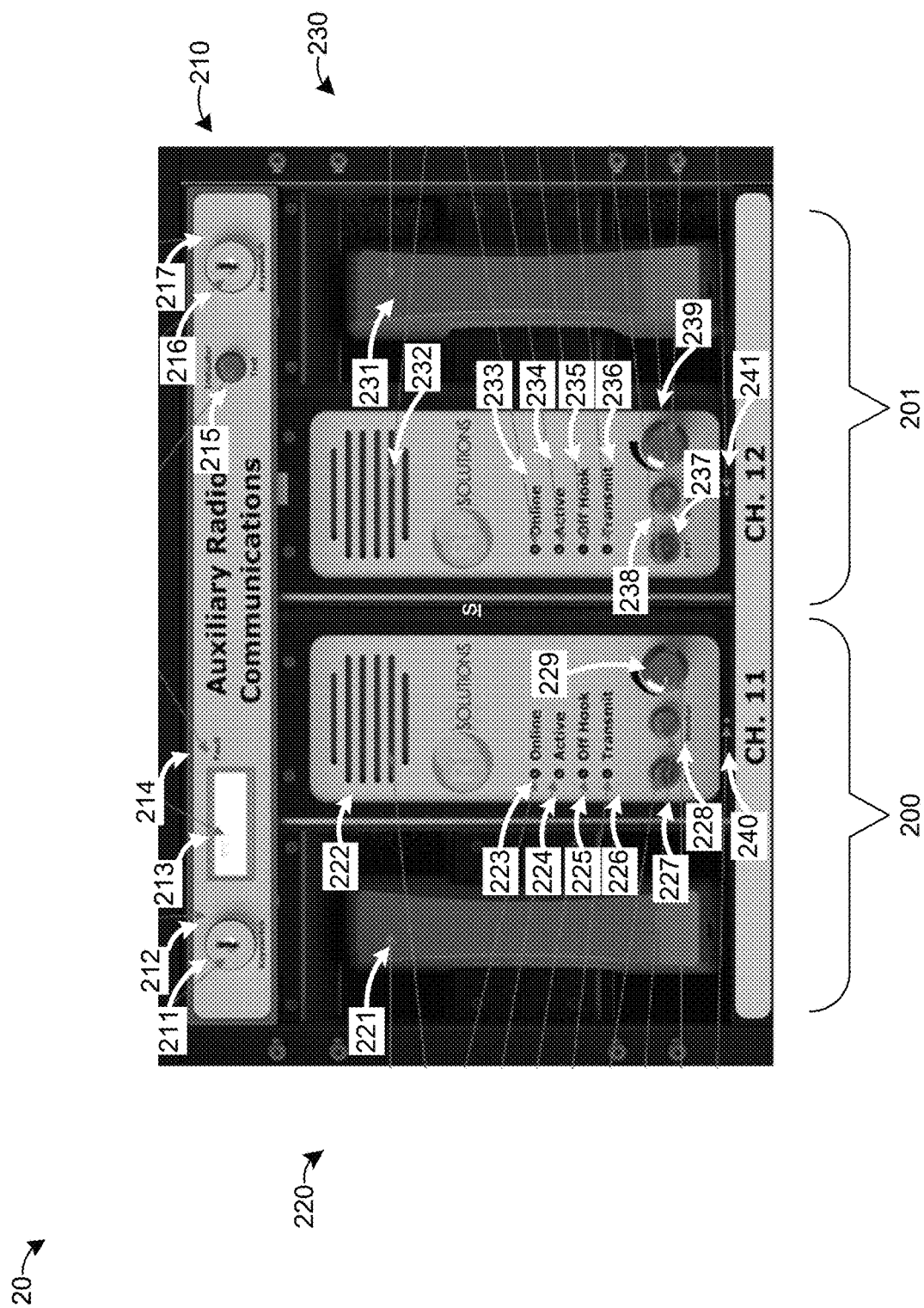
FIG. 2 is a front view of a dispatch radio console according to one or more embodiments.

FIG. 2 illustrates a DRC 20 according to one or more embodiments. DRC 20 can be the same as, substantially the same as, or different than DRC 100. DRC 20 includes first and second DCMs 200, 201 and a DRC Control and Monitoring Module (DCAM) 210. Each DCM 200, 201 is associated with a respective communication channel (e.g., radio channels 11 and 12, respectively) for communicating with wireless devices (e.g., radios 130, 132), held by emergency responders, that are tuned to the respective frequency of the communication channel. Each communication channel is dedicated for a separate conversation with the emergency responders located in the building. As such, a first user can communicate with a first subset of the emergency responders using DCM 200 over channel 11 while a second user communicates with a second subset of the emergency responders using DCM 201 over channel 12.

Each DCM 200, 201 includes respective channel controls and indicators 220, 230. The channel controls and indicators 220, 230 include a respective handset 221, 231, speaker 222, 232, online LED 223, 233, active LED 224, 234, off hook LED 225, 235, transmit LED 226, 236, PTT switch 227, 237, monitor switch 228, 238, volume control 229, 239, and microphone 240, 241. The PTT switch 227, 237 activates a remote microphone for push-to-talk functionality and hands-free talking. The monitor switch 228, 238 removes the CTCSS (continuous tone-coded squelch system) to allow the receipt of weaker signals that are below the squelch threshold. The DCMs 200, 201 are in electrical communication with DCAM 210 and an interconnect board, as discussed in more detail below.

DCAM 210 includes a channel 11 key switch 211, a channel 11 key switch indicator LED 212, a status and alarm display 213, a fault indicator LED 214, an indicator test button 215, a channel 12 key switch 216, and a channel 12 key switch indicator LED 217. The indicator test button 215 can be used to test the functionality of the LEDs 212, 214, 217, 223-226, and/or 233-236.

One or more DRCs 20 can be installed in a building (e.g., a high-rise building) to provide one or more command centers for directing and communicating with emergency responders located in the building. For example, a first DRC can be installed in the building's lobby and a second DRC can be installed on the third floor. The second DRC can be available as a redundant command center in case the lobby is flooded, on fire, or otherwise unavailable.

In some embodiments, the DRC 20 includes only one DCM (e.g., DCM 200, DCM 201, or another DCM). The DCM can be mounted on either side of the DRC, such as described in U.S. Provisional Application No. 62/616,830 and the subsequent non-provisional application thereof.

DCM 30 includes a plurality of components including console housing, console, speaker, LEDs, receiver, cradle, bracket, control board 301, spacers, board bracket, interface board 302, potentiometer, spacers, and controls. Control board 301 and interface board 302 are described in more detail below.

Figure 3A:
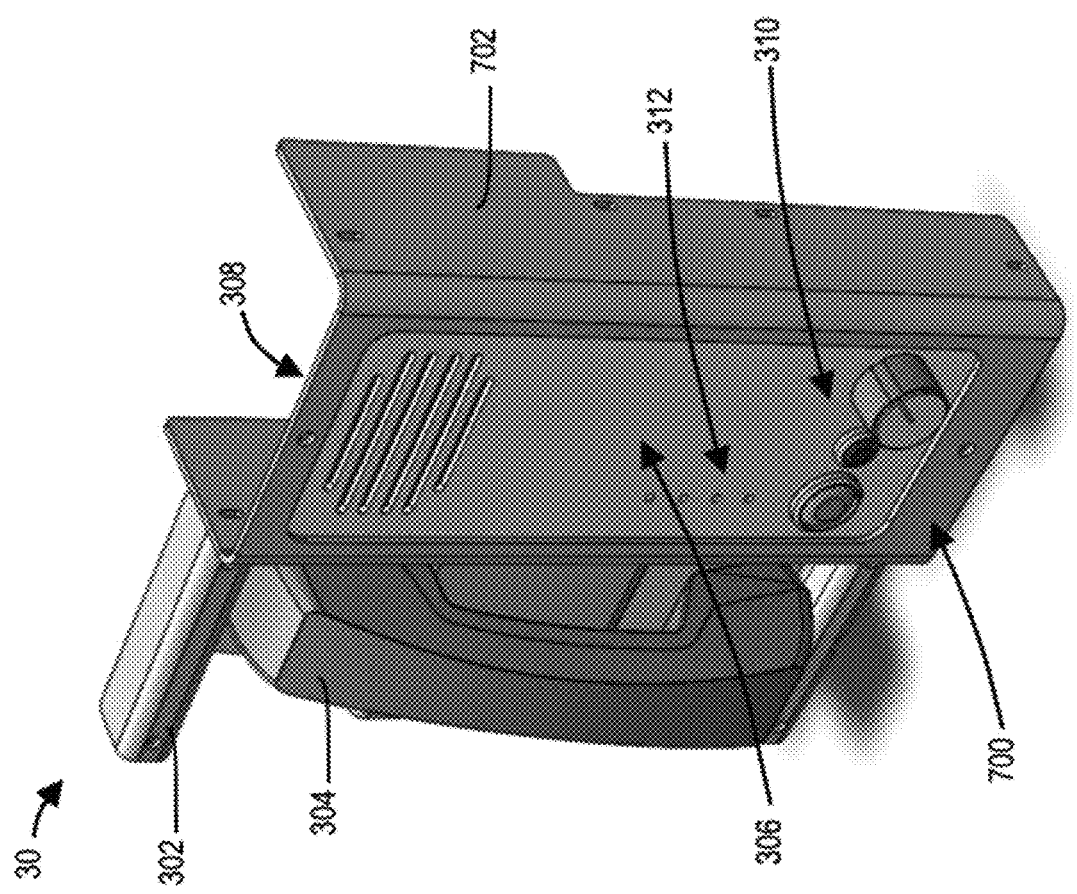
FIG. 3A is an exploded perspective view of a portion of a dispatch control module in a first configuration according to one or more embodiments.
Figure 3B:
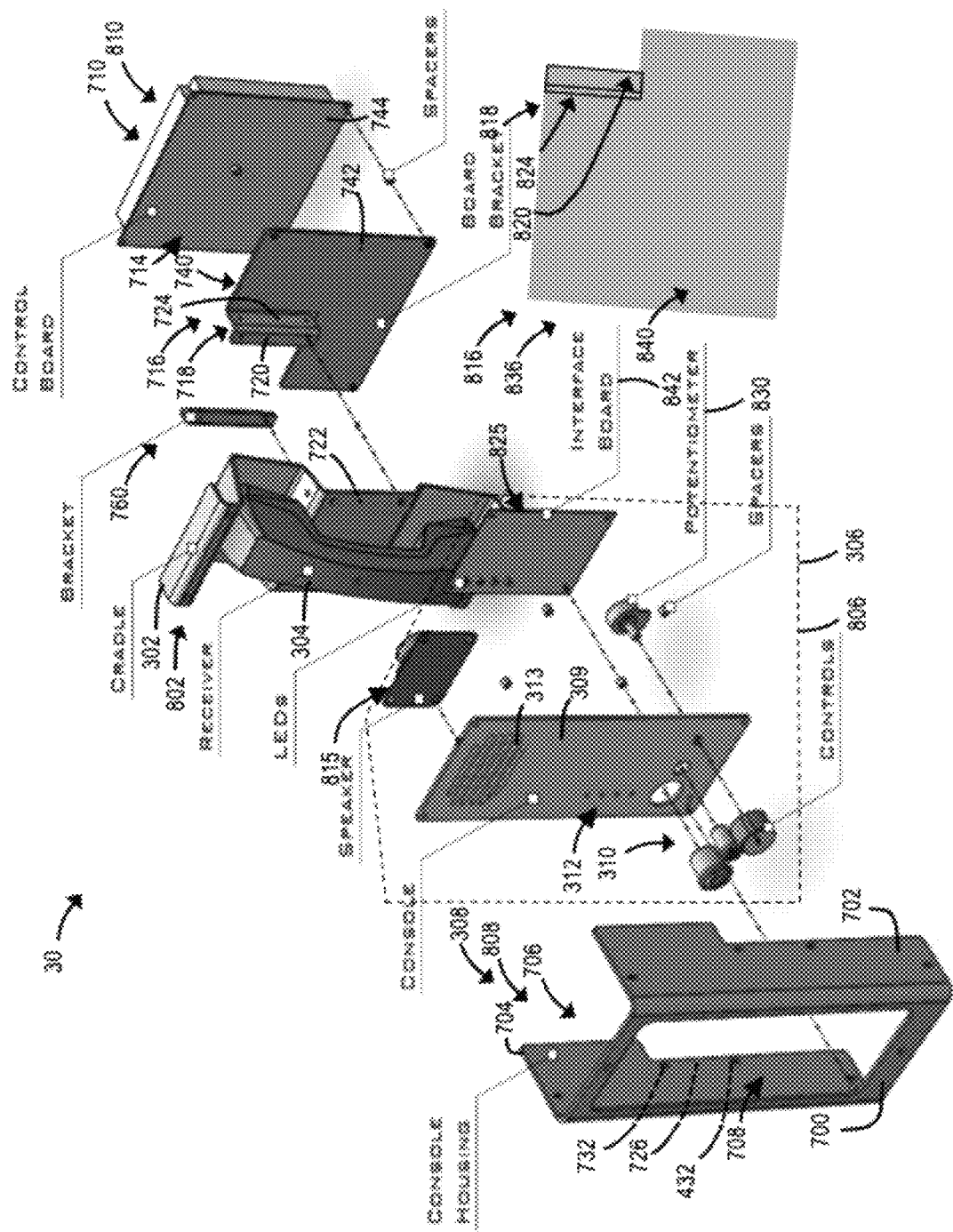
FIG. 3B is an exploded perspective view of a portion of the dispatch control module of FIG. 3A in a first configuration according to one or more embodiments.
Figure 3C:
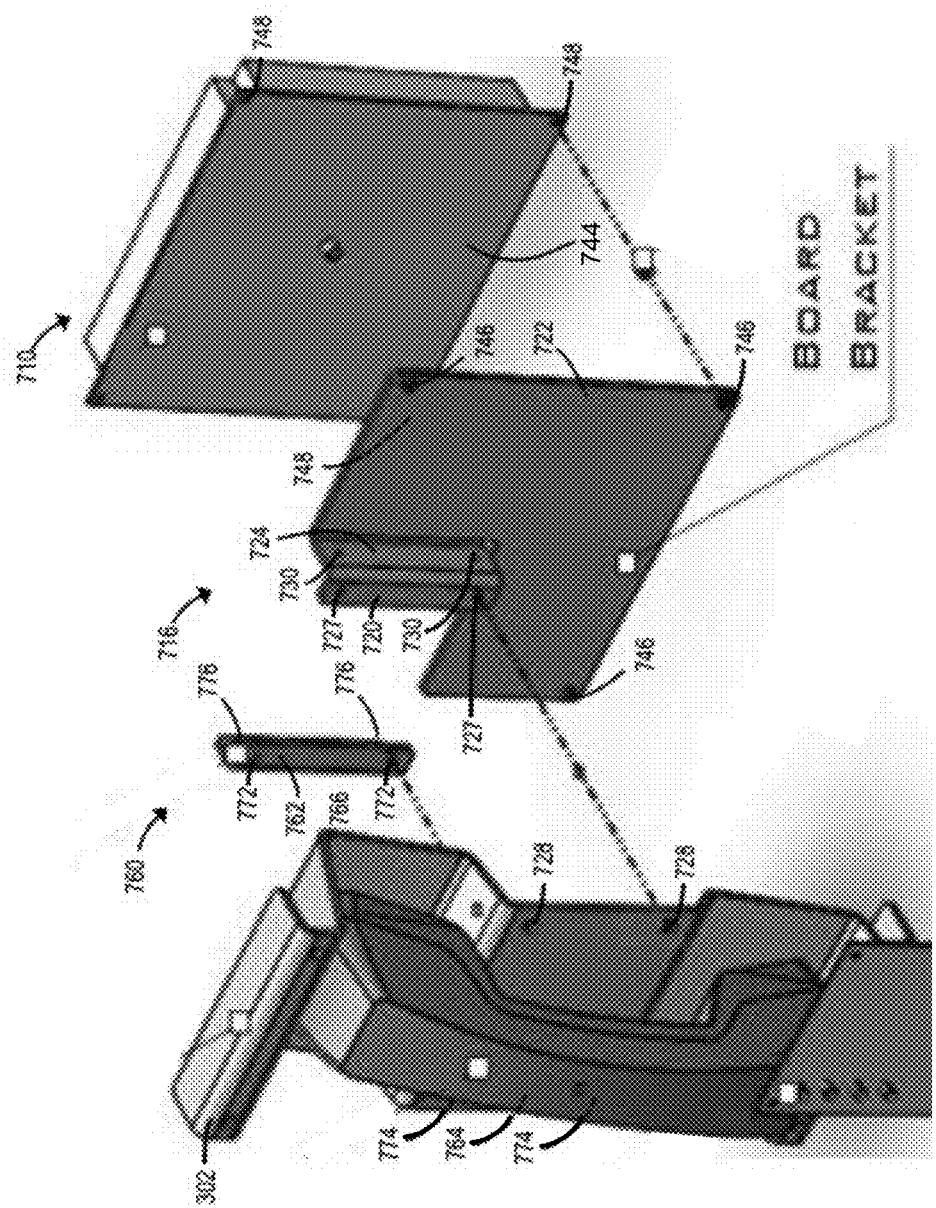
FIG. 3C is an enlarged exploded view of a portion of the dispatch control module of FIG. 3A in a first configuration according to one or more embodiments.

FIG. 3A is an exploded perspective view of a portion of a DCM 30 in a first configuration according to one or more embodiments. FIG. 3B is an exploded perspective view of a portion of DCM 30 in a first configuration according to one or more embodiments. FIG. 3C is an enlarged exploded view of a portion of DCM 30 in a first configuration according to one or more embodiments.

DCM 30 includes a cradle 302, a handset 304 (having a handle, a receiver, and a transmitter) removably disposed on (e.g., supported by) the cradle 302, a console assembly 306, and a housing 308 that supports the console assembly 306. DCM 30 can be the same as or substantially the same as DCM 200 and/or DCM 201.

Figure 7:
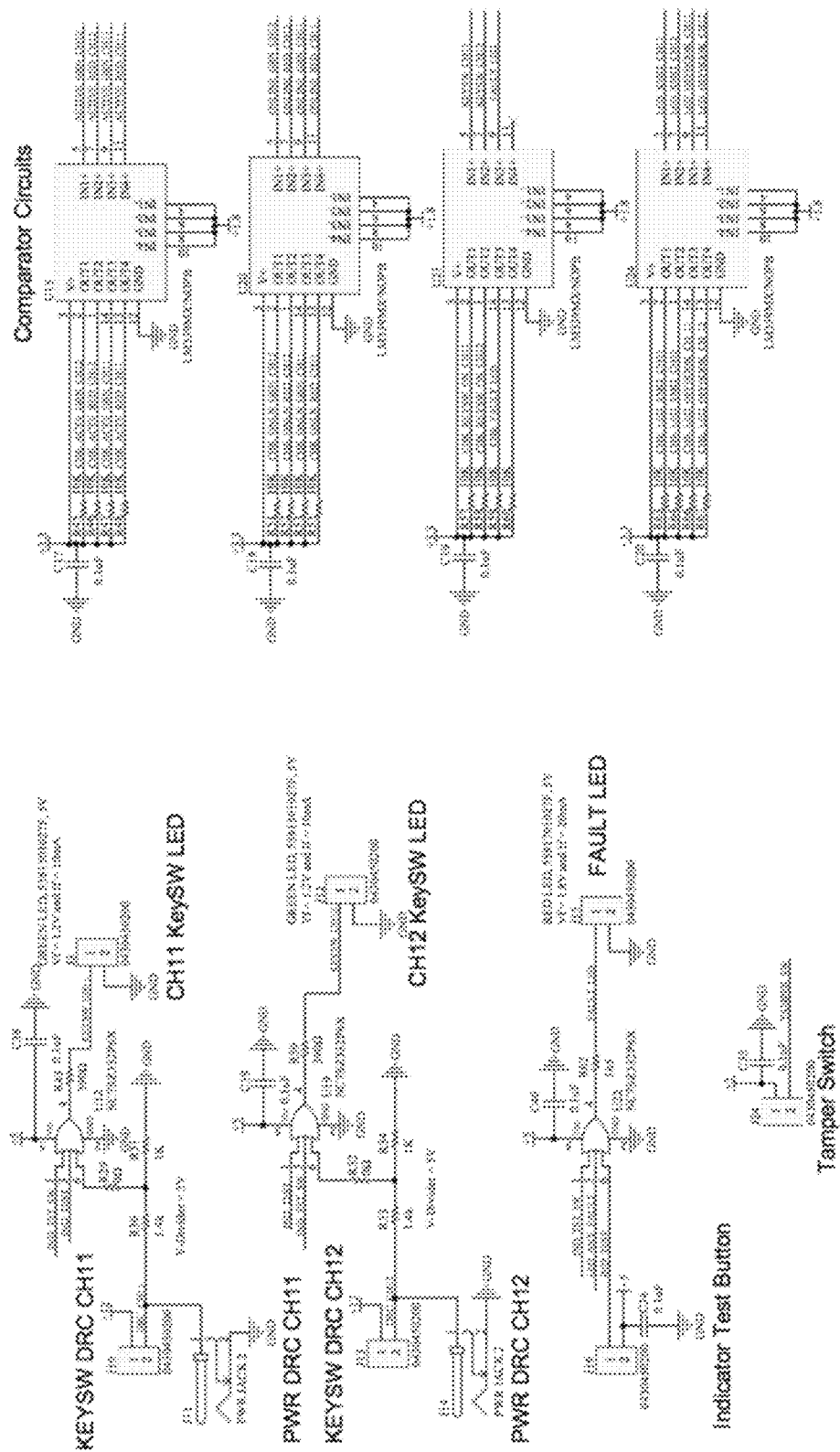
FIGS. 7-12 are circuit diagrams of one or more circuits that can be included in the DCAM/RCAM logic boards of FIG. 5 and/or of FIG. 6 according to one or more embodiments.
Figure 8:
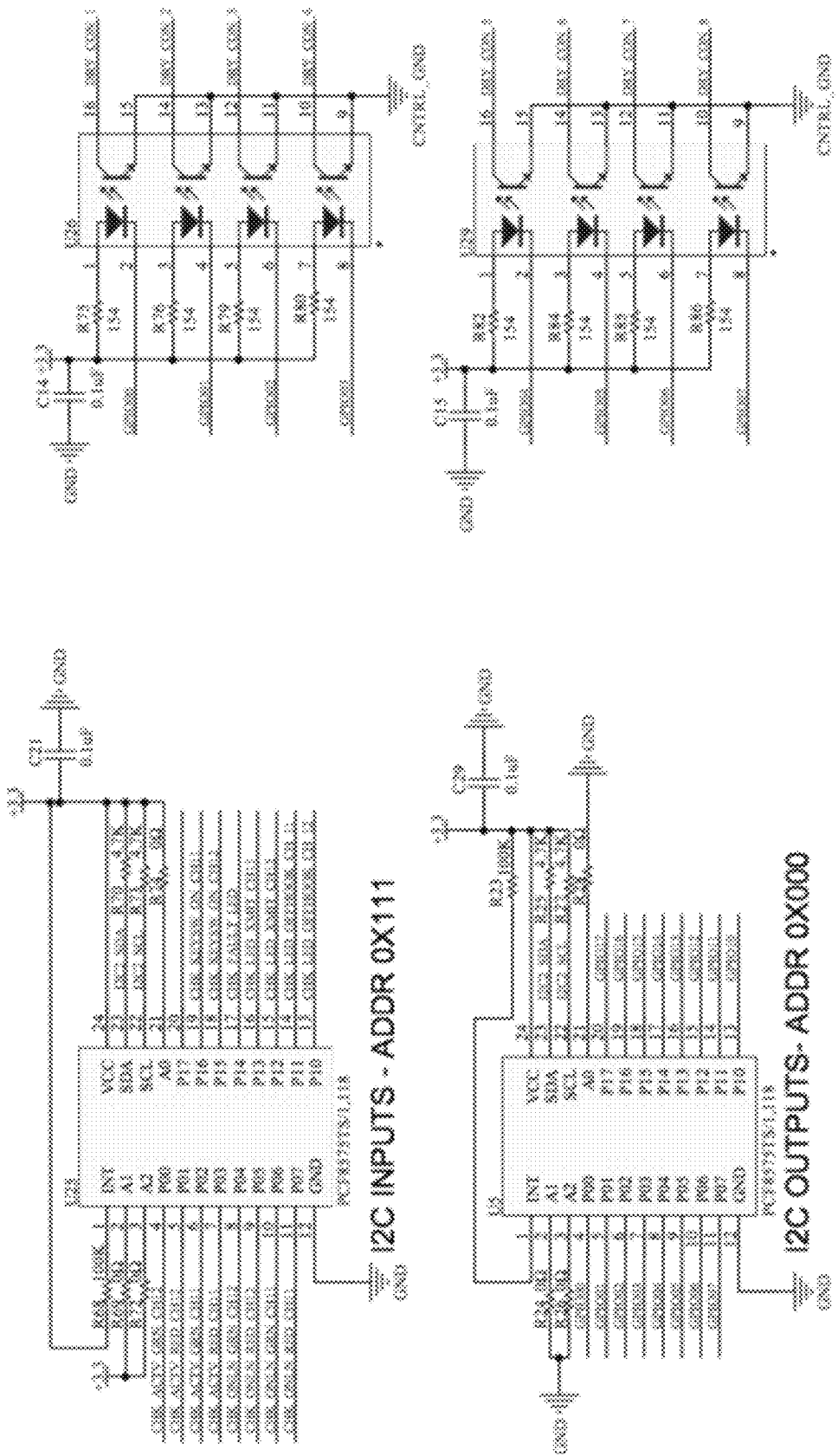
Figure 9:
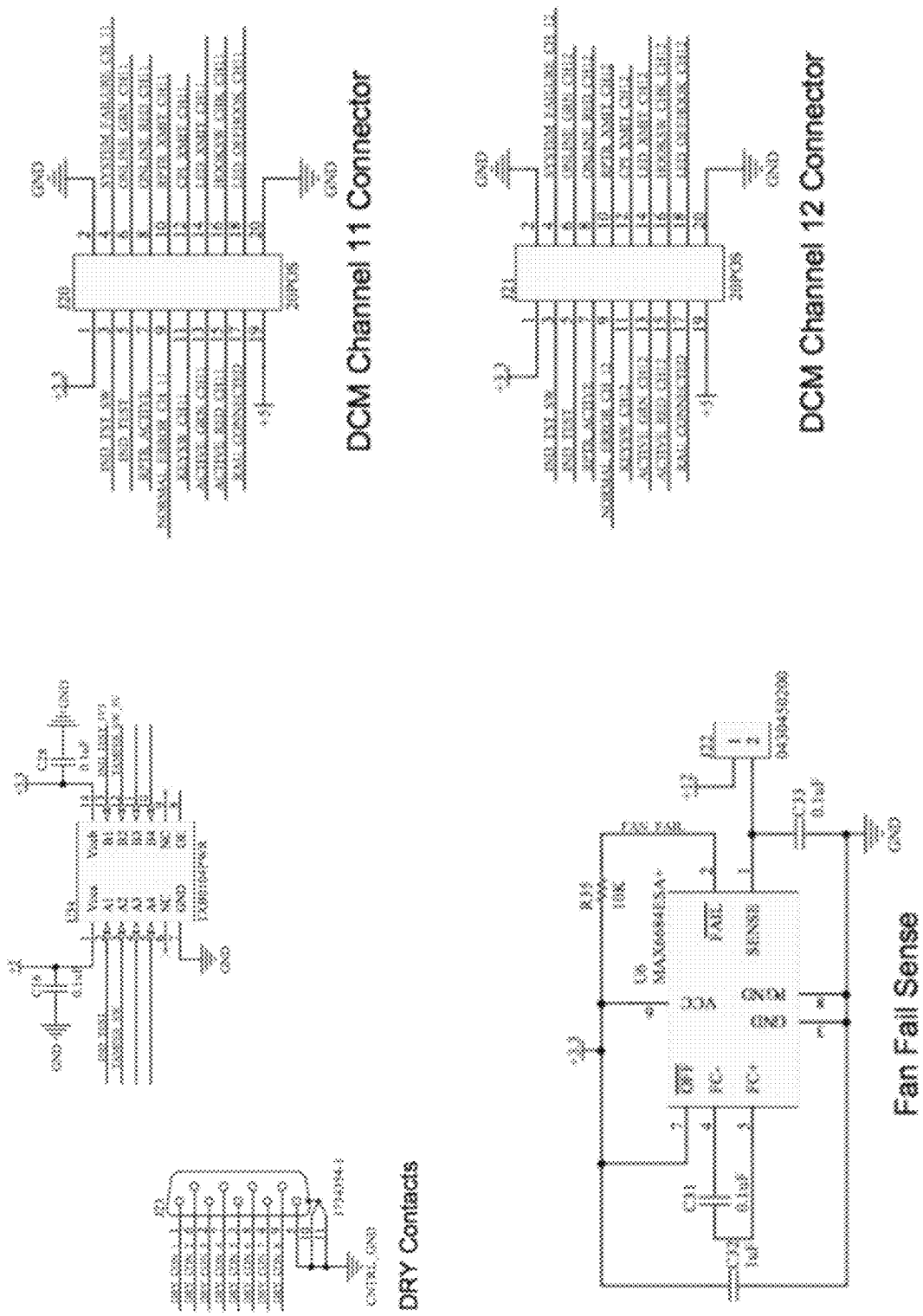
Figure 10:
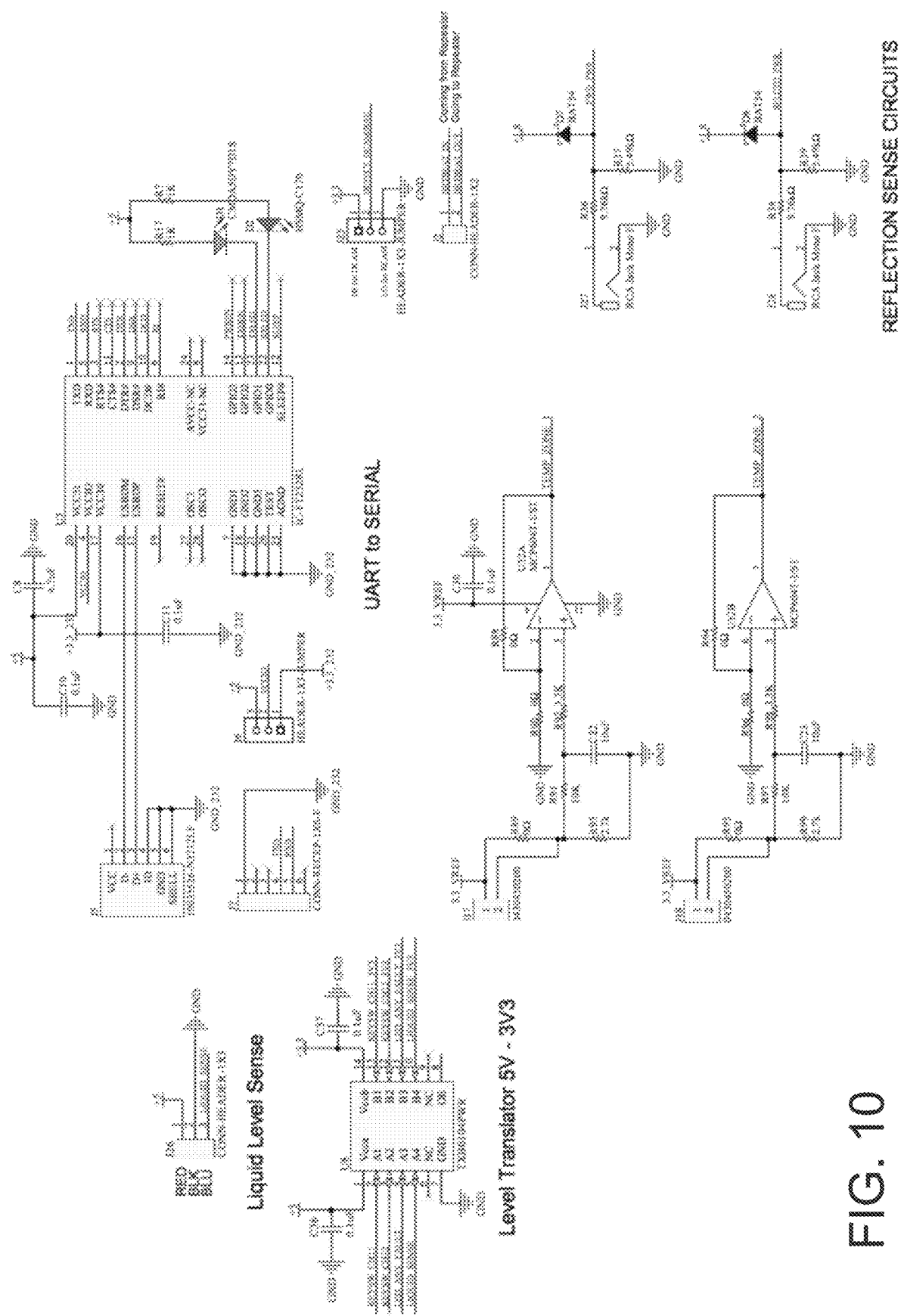
Figure 11:
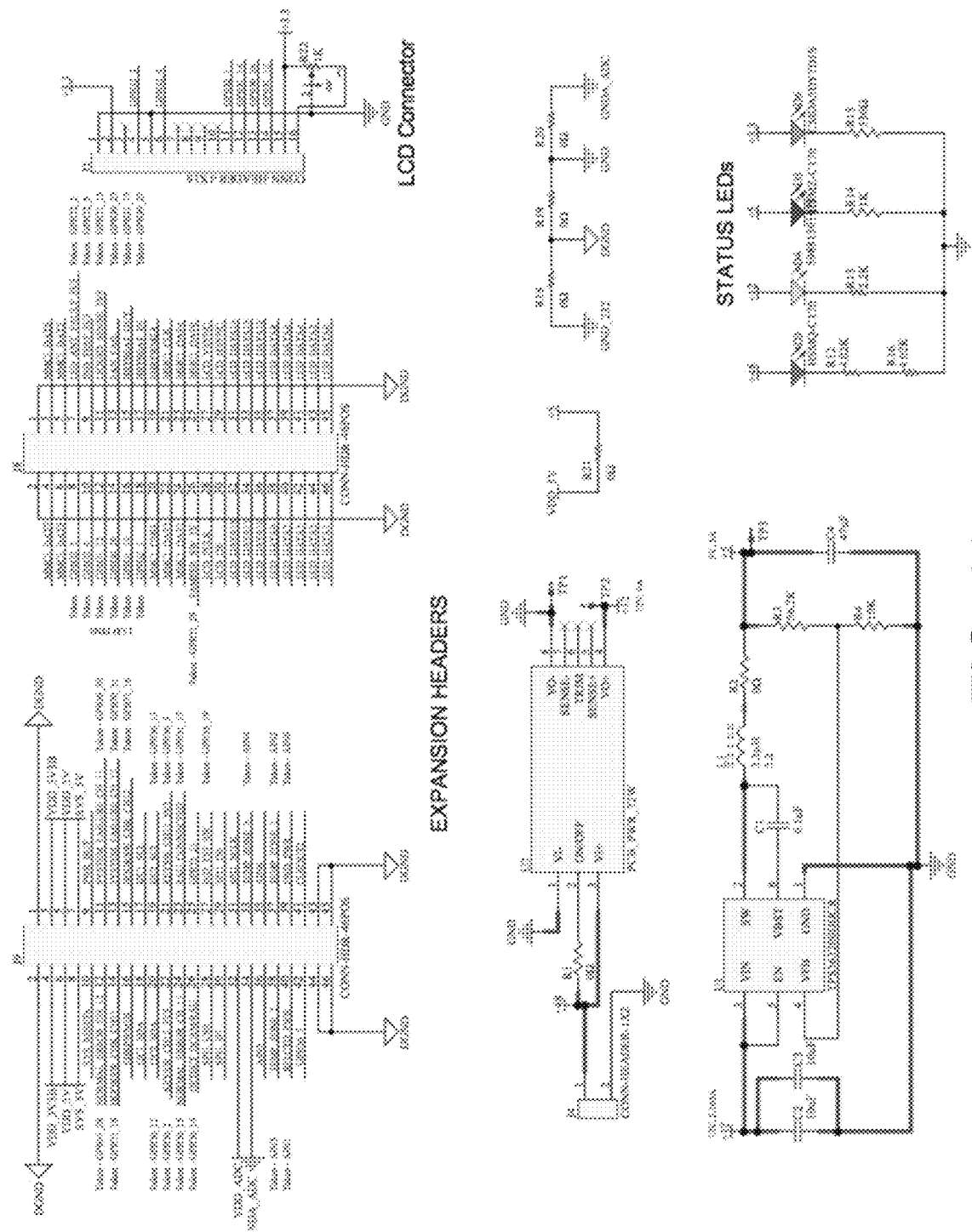
Figure 12:
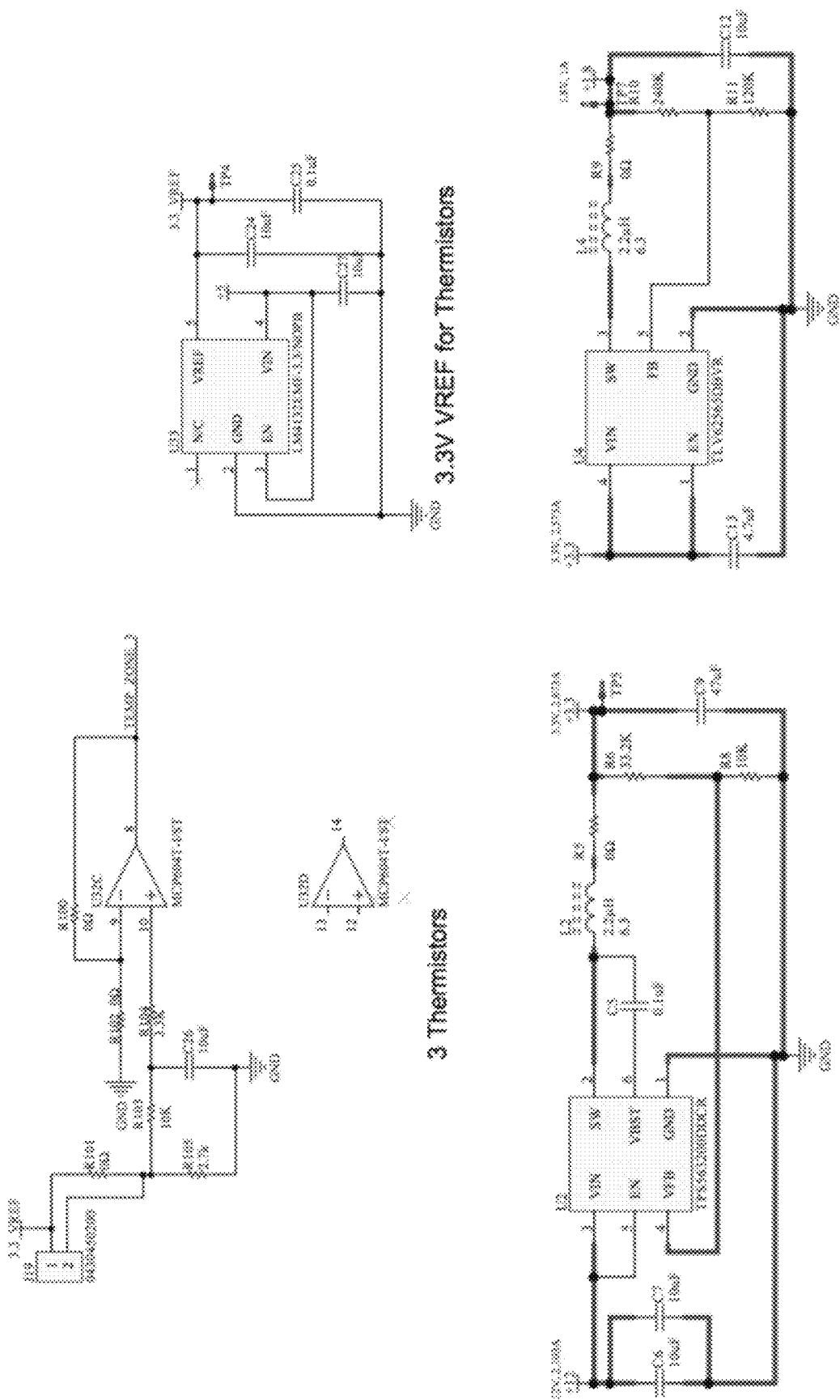

The console assembly 106 includes one or more manual controls 310, one or more visual indicators 312, and/or an audio system (which may include a speaker disposed behind speaker openings 313 on the front side 309 of the console assembly 306). Although shown as buttons and knobs, the manual controls 310 may additionally or alternatively include a keypad (touch screen or otherwise) and/or any other type(s) of input device(s). The manual controls 310 can be used to select the wireless communication channel (e.g., an emergency communication channel) to receive and/or send wireless communications via handset 304, which can be coupled to wireless antennae in a multi-story building (e.g., as illustrated in FIG. 7). The one or more visual indicators 312 may indicate status and/or other information of DCM 30 (and/or the corresponding DCR). Although shown as light emitting diodes and/or miniature lamps, the one or more visual indicators 312 may additionally or alternatively include a display and/or any other type(s) of visual indicator(s).

The housing 308 may have a front side 700, and two sides 702, 704, which may be arranged in a U-shape (e.g., in cross section) and/or which may define a channel 706. The sides 702, 704 extend from the front side 700 to a back or a back side of the housing 308

A "U-shape" is not limited to the U-shape shown in the figures. For example, a U-shape may have any suitable types of edges, e.g., rounded, e.g., as shown, beveled, squared and/or otherwise. The front and/or sides may be planar, e.g., as shown, but are not limited to such. For example, the front may have a radius or curve from side to side. The sides may be perpendicular (90 degrees relative) to the front, e.g., as shown, but are not limited to such. Additionally, the term "U-shaped" does not preclude the addition of a top, bottom and/or rear portions to the housing.

The front 700 of the housing 308 may define an opening 708 to receive the front side 309 of the console assembly 306. The opening 708 may be rectangular, e.g., as shown, and/or may encompass a major portion (e.g., at least 50%) of the front 700 of the housing 308. However, the front 700 of the housing 308 and the opening 708, if present, are not limited to the above.

The console assembly 306 may further include a potentiometer 830 (which may be mechanically and/or electrically connected to one or more of the one or more manual controls 110) and/or an interface board 842 (having electrical components mounted thereon), which may be electrically connected to the one or more manual controls 310 and/or the one or more visual indicators 312 to enable the console assembly to provide its functionality, as may be desired.

In at least some embodiments, including but not limited to the illustrated embodiment, the cradle 302, the housing 308 and/or the front 309 of the console assembly 306 may have an open construction and may comprise walls having uniform (and/or substantially uniform) thickness and bends that define, at least in part, the shape of the cradle 302, housing 308 and/or front side 309 of the console assembly 306.

DCM 30 may further include a rear assembly 710 or other rear component(s), which may comprise a circuit board assembly (which may include a printed circuit board 714 and electrical components attached thereto), which may perform one or more functions of the DCM 30. In at least some embodiments, the rear assembly 710 may comprise a control assembly, which may perform one or more control functions of the DCM 30.

As stated above, in accordance with at least some aspects, the cradle 302 is releasably attachable to a first one (e.g., right side 702) of the two sides 702, 704 (e.g., right side 702, left side 704) of the housing 308 to position the cradle 302 on a first side of the DCM 30 (adjacent to or otherwise to the side of a first one of the two sides 702, 702 of the housing 308), and releasably attachable to a second one (e.g., left side 704) of the two sides 702, 704 of the housing 308 to position the cradle 302 on a second side of the DCM 30 (adjacent to or otherwise to the side of a second one of the two sides 702, 704 of the housing 308).

In that regard, in at least some embodiments, including but not limited to the illustrated embodiment, DCM 30 may include a bracket 716 that is connected between the cradle 302 and one of the two sides 702, 704 of the housing 308, as may be desired, to thereby attach the cradle 302 thereto (i.e., to the one of the two sides 702, 704 of the housing 308).

In the illustrated embodiment, the bracket 716 is connected between the cradle 302 and the left side 704 of the housing 308, to thereby attach the cradle 302 thereto (i.e., to the left side 704 of the housing 308) and position the cradle 302 on the left side of DCM 30 (adjacent to or otherwise to the side of the left side 704 of the two sides 702, 704 of the housing 308).

In at least some embodiments, including but not limited to the illustrated embodiment, the bracket 716 may comprise an L-shaped (or other type) bracket 718 having a front body 720 and a side body 724 that are orthogonal to each other. The front body (or front surface) 720 is releasably attachable to a back side (e.g., rear facing (or other) surface) 722 of the cradle 302. The side body 724 (or side surface) is releasably attachable to an outer facing (or other) surface 726 of the one of the two sides 702, 704 of the housing 308. The front body 720 and the side body 724 can form first and second legs of the L-shaped bracket 718.

In at least some embodiments, including but not limited to the illustrated embodiment, the bracket 718 may define openings 727 (FIG. 3C) and the cradle 302 may define openings 728 (FIG. 3C), in register therewith or otherwise corresponding thereto, to receive bolts or fasteners that connect (releasably or otherwise) and/or maintain (releasably or otherwise) the connection between the front body 720 of the bracket 718 and the back side 722 of the cradle 302.

Additionally, the bracket 718 may define openings 730 and the housing 308 may define openings 732 (FIG. 3B), in register therewith or otherwise corresponding thereto, that receive bolts or fasteners to connect (releasably or otherwise) and/or maintain (releasably or otherwise) the connection between the side body 724 of the bracket 718 and the outer facing surface 726 of the one of the two sides 702, 704 of the housing 308.

Alternatively, in place of one or more such opening(s) and fastener(s) that connect or otherwise maintain a connection between two surfaces, some embodiments may employ a catch to connect (releasably or otherwise) and/or maintain (releasably or otherwise) the connection between the two surfaces. In some embodiments, the catch may comprise one or more male or other features on one surface and one or more female or other features on the other surface, wherein the one or more male or other features on the one surface releasably engage the one or more female or other features on the other surface to connect (releasably or otherwise) and/or maintain (releasably or otherwise) the connection via interference, friction and/or otherwise.

It may also be desired to connect the cradle 302 to the rear assembly 710. In that regard, in at least some embodiments, the bracket 716 may also be connected between the cradle 302 and the rear assembly 710, to thereby connect the cradle 302 to the rear assembly 710. The bracket 716 can include additional openings (e.g., openings 730) to receive bolts or fasteners to form these connections.

In at least some embodiments, including but not limited to the illustrated embodiment, the bracket 716 may have the form of or otherwise comprise (or be coupled to) a board (or other type of) bracket that includes the bracket 718 discussed above and further includes a board (or other shape) portion 740 attached to the bracket 718 and having a rear facing (or other) surface 742 connected to a front facing (or other) surface 744 of the rear assembly 710.

In at least some embodiments, including but not limited to the illustrated embodiment, the board portion 740 may define openings 746 (Fig. C) and the rear assembly 710 may define openings 748 (FIG. 3C), in register therewith or otherwise corresponding thereto, that receive bolts or fasteners (which may also pass through spacers) to connect (releasably or otherwise) and/or maintain (releasably or otherwise) the connection between the surface 742 of the board (or other shape) portion 740 and the surface 744 of the rear assembly 710.

In at least some embodiments, including but not limited to the illustrated embodiment, the rear facing (or other) surface 742 of the board portion 740 may have a height and a width that is substantially the same as a height and a width, respectively, of the front facing (or other) surface 744 of the rear assembly 710.

As discussed above, in place of one or more such opening(s) and fastener(s) that connect or otherwise maintain a connection between two surfaces, some embodiments may employ a catch to connect (releasably or otherwise) and/or maintain (releasably or otherwise) the connection between the two surfaces. In some embodiments, the catch may comprise one or more male or other features on one surface and one or more female or other features on the other surface, wherein the one or more male or other features on the one surface releasably engage the one or more female or other features on the other surface to connect (releasably or otherwise) and/or maintain (releasably or otherwise) the connection via interference, friction and/or otherwise.

If a connection between the cradle 302 and the rear assembly 710 is desired but the bracket 716 is not to be used for such, a separate bracket may be connected between the cradle 302 and the rear assembly 710.

It may also be desired to connect the cradle 302 to a case or housing of the DRC. In that regard, in at least some embodiments, DCM 30 may include a bracket 760 that is connected between the cradle 302 and one side of the case or housing to thereby attach the cradle 102 thereto (i.e., to the one side of the case or housing).

In at least some embodiments, including but not limited to the illustrated embodiment, the bracket 760 may comprise an L-shaped (or other type) bracket having a front facing (or other) surface 762 of a first leg (or other portion) connected to a rear facing (or other) surface 764 of the cradle 302, and having a side facing (or other) surface 766 of a second leg (or other portion) connected to an inner facing (or other) surface (not shown) of the one side of the case or housing.

In at least some embodiments, including but not limited to the illustrated embodiment, the bracket 760 may define openings 772 and the cradle 302 may define openings 774, in register therewith or otherwise corresponding thereto, that receive bolts or fasteners to connect (releasably or otherwise) and/or maintain (releasably or otherwise) the connection between the surface 762 of the bracket 760 and the surface 764 of the cradle 302.

Additionally, the bracket 760 may define openings 776 and the case or housing may define openings (not shown), in register therewith or otherwise corresponding thereto, that receive bolts or fasteners to connect (releasably or otherwise) and/or maintain (releasably or otherwise) the connection between the surface 766 of the bracket 760 and the surface (not shown) of the one of the sides of the case or housing.

Alternatively, in place of one or more such opening(s) and fastener(s) that connect or otherwise maintain a connection between two surfaces, some embodiments may employ a catch to connect (releasably or otherwise) and/or maintain (releasably or otherwise) the connection between the two surfaces. In some embodiments, the catch may comprise one or more male or other features on one surface and one or more female or other features on the other surface, wherein the one or more male or other features on the one surface releasably engage the one or more female or other features on the other surface to connect (releasably or otherwise) and/or maintain (releasably or otherwise) the connection via interference, friction and/or otherwise.

Figure 4:
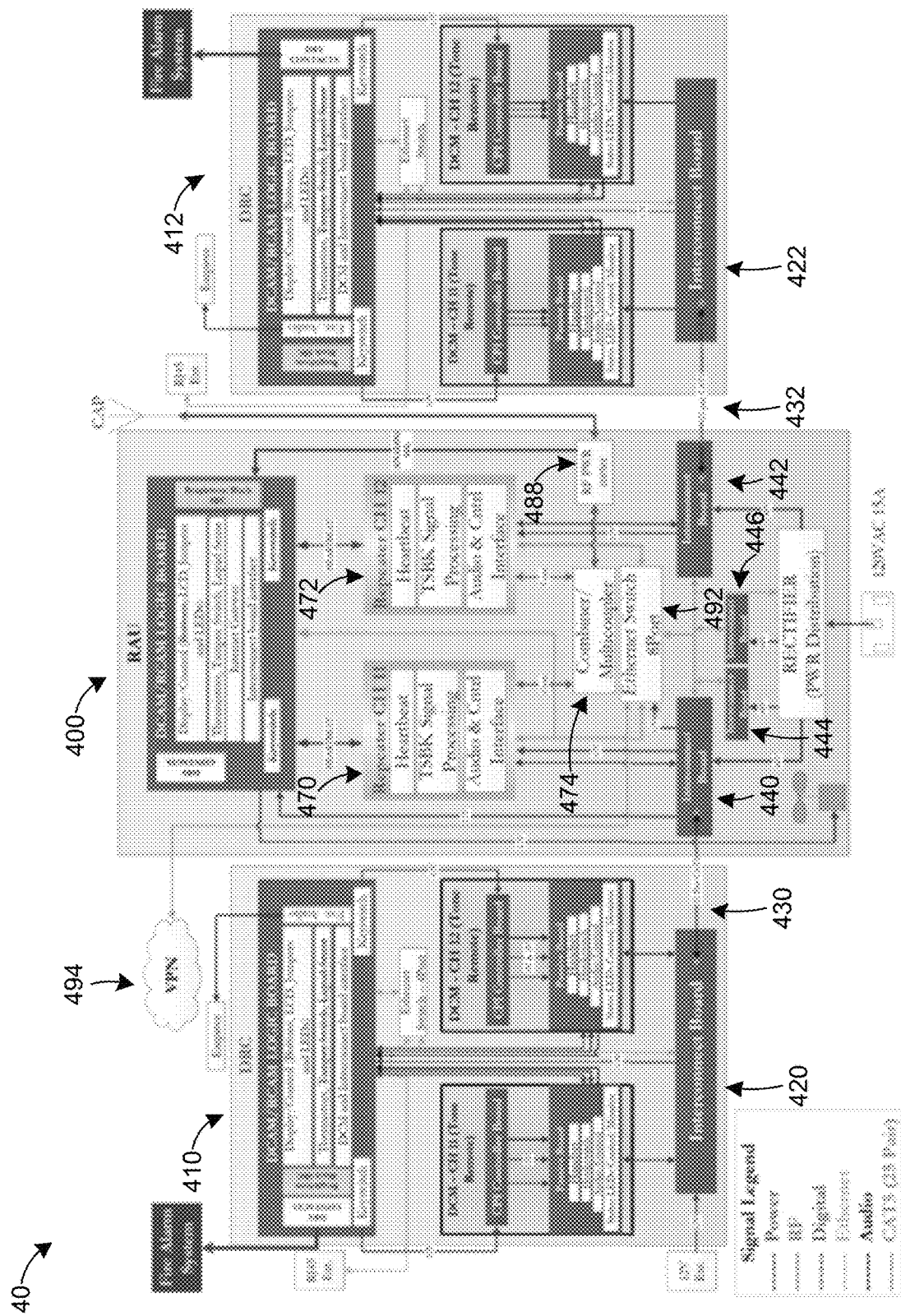
FIG. 4 is a block diagram of an auxiliary radio communications system that includes a repeater amplification unit and first and second dispatch radio consoles according to one or more embodiments.
Figure 5:
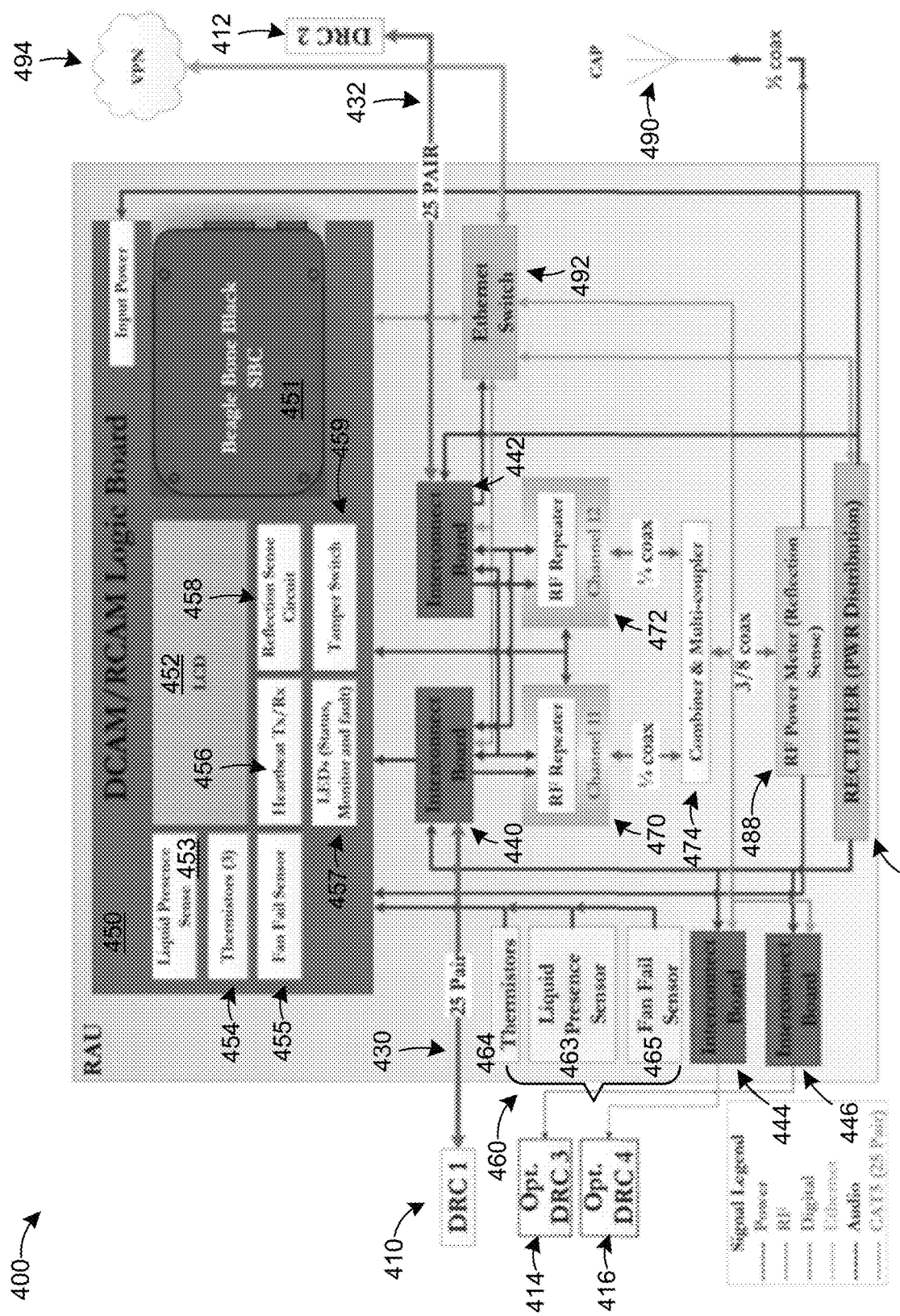
FIG. 5 is an enlargement of the block diagram of the repeater amplification unit illustrated in FIG. 4.

As stated above, FIGS. 3-5 show the system in a first configuration. In at least some embodiments, if it is desired to attach the cradle 302 to a first one 702 of the two sides 702, 704 of the housing 308 to position the cradle 302 on a first side of DCM 30 (adjacent to or otherwise to the side of a first one 702 of the two sides 702, 704 of the housing 308), instead of (and/or after) attaching the cradle to the second one 704 of the two sides 702, 704 of the housing 308 to position the cradle 302 on the second side of DCM 30, a second bracket 816 (e.g., a second L-shaped bracket 818) that is a mirror image of the first bracket 716 (e.g., of the first L-shaped bracket 718) may be employed, and the attachments and connections described above may be modified accordingly for the second configuration, compared to those discussed above for the first configuration, in order to thereby position the cradle 302 on the first side of the system (adjacent to or otherwise to the side of the first one 702 of the two sides 702, 704 of the housing 308).

For example, in the first configuration the front body 720 of the first L-shaped bracket 718 is releasably attached to the back side 722 of the cradle 302 and the side body 724 of the first L-shaped bracket 718 is releasably attached to the first side 702 (e.g., right side) of the housing 308. In the second configuration, the front body 820 of the second L-shaped bracket 818 is releasably attached to the back side 722 of the cradle 302 and the side body 824 of the second L-shaped bracket 818 is releasably attached to the second side 704 (e.g., left side) of the housing 308. The second bracket 816 and/or the second L-shaped bracket 818 can include a second board-shaped bracket 840.

Thus, in at least some embodiments, DCM 30 has at least two configurations and is dynamically re-configurable between the first configuration and the second configuration without causing damage to or otherwise irreversibly modifying the structure of the cradle 302, the handset 304, the console 106, the housing 108, and/or the case or housing of the DCR.

In at least some aspects, some or all of the above components of the system may be included in a kit for constructing the system, in a dynamically-configurable state or otherwise.

In at least some embodiments, the modified connections may be assisted if the cradle 302, the housing 308 and the case or housing of the DCR are symmetrical (or at least substantially symmetrical). As used herein, "substantially symmetrical" means symmetrical to within +/−5%. In some other embodiments, the cradle 302 and/or housing 308 are not entirely symmetrical and/or not entirely substantially symmetrical, but the location and configuration of features that relate to the attachments and connections may be symmetrical and/or substantially symmetrical. Some embodiments may not include any of the above.

As can be seen, DCM 30 includes a plurality of interconnected modules. Each module can be generally rectangular or another shape, and the size of each module can be the same or different than one or more of the other modules. For example, a console assembly module 806 (e.g., including console assembly 306) is configured and arranged to be disposed in a housing module 808 (e.g., including housing 308). In addition, a speaker module 815 (which is disposed behind speaker openings 313 on console 306) and/or an interface board module 825 is configured and arranged to be disposed in a portion of the console assembly module 806. A first bracket module 816 (e.g., including bracket 716 and/or L-shaped bracket 718) and a second bracket module 836 (e.g., including second bracket 816 and/or second L-shaped bracket 818) are configured and arranged to be removably attached to a cradle module 802 (e.g., including cradle 302) and to the housing module 808. The cradle module 802 can be disposed next to a first side of the housing module 808 using the first bracket module 816, and the cradle module 802 can be disposed next to a second side of the housing module 808 using the second bracket module 836. The cradle module 802 is configured and arrange to removably receive the handset 304. In addition, a control board module 810 (e.g., including rear assembly 710) is configured and arranged to be removably attached to the first or second bracket modules 816, 836.

FIG. 4 is a block diagram of an ARC 40 that includes an RAU 400 and first and second DRCs 410, 420 according to one or more embodiments. RAU 400 is in electrical communication with each DRC 410, 420 through a Category 5 cable (CAT5 cable), which is preferably disposed in a pathway that has at least a 2-hour fire rating. A first CAT5 cable 430 electrically connects or couples a first interconnect board 440 (e.g., a first RAU interconnect board) on RAU 400 with an interconnect board 420 (e.g., a first DRC interconnect board) on the first DRC 410. A second CAT5 cable 432 electrically connects or couples a second interconnect board 442 (e.g., a second RAU interconnect board) on RAU 400 with an interconnect board 422 (e.g., a second DRC interconnect board) on the second DRC 412. As a result, RAU 400 is in electrical communication with the first DRC 410 and the second DRC 412. RAU 400 includes two additional interconnect boards to connect with two additional DRCs. Additional or fewer interconnect boards and DRCs can be provided in other embodiments. The interconnect boards can be breakout boards in some embodiments. In addition, the interconnect boards can provide circuitry that allows power, network communications, voice communications, and data to be transmitted over a single cable (e.g., a 25-pair or 25PR cable) thereby simplifying the installing and reducing the size of the field interface area. A single 25PR connector can be "broken out" to separate connectors including, e.g., 7 different power terminations and 5 different RJ-45 ports for various component interconnections.

ARC 40 can be disposed and arranged in a high-rise building or other structure to enhance wireless (e.g., radio) communication among emergency responders and between emergency responders and a local dispatcher(s), as discussed above. The DRCs 410, 412 can be located in various locations in the building, such as in the lobby, the second floor, etc. In general, the DRCs 410, 412 are located in an easily-accessible location for use during emergencies (e.g., fires, floods, etc.). The RAU 400 can be located in a less-accessible location, such as the basement of the building. The RAU 400 is preferably located in a structure that has a 2-hour fire rating, such as a utility or an electrical closet.

FIG. 5 is an enlargement of the block diagram of RAU 400. RAU 400 includes interconnect boards 440, 442, 444, 446, DCAM/RCAM logic board 450, sensors 460, RF repeaters 470, 472, and rectifier 480. As discussed above, RAU 400 is electrically connected to first and second DRCs 410, 412 via first and second interconnect boards 440, 442 and CAT5 cables 430, 432, respectively. RAU 400 can also be electrically connected to optional third and fourth DRCs 414, 416 via third and fourth interconnects boards 444, 446 and respective cables (e.g., CAT5 cables). The interconnect boards 440, 442, 444, 446 are in electrical communication with Ethernet switch/VPN router 492, which is in electrical communication with a network 494 (e.g., a VPN), which can allow for remote access (e.g., to monitor, update, etc.) to RAU 400 and/or DRCs 410, 412. In addition, each interconnect board 440, 442, 444, 446 is in electrical communication with RF repeaters 470, 472 for respective channels.

The RF repeaters 470, 472 are in electrical communication with each other (e.g., via digital and audio lines), with interconnect boards 440, 442 (e.g., via audio and power lines), and with DCAM/RCAM logic board 450 (e.g., via digital lines). The RF repeaters 470, 472 are also in electrical communication with RF power meter 488 via coaxial cables and a combiner & multi-coupler 474. The antennas 490 are electrically connected to the RAU 400 via a pathway that has a 2-hour fire rating. Through this connection, the antennas 490 are in electrical communication with the RAU 400 including the RF repeaters 470, 472.

The DCAM/RCAM (RCAM is an abbreviation for RAU Control and Monitoring Module) logic board 450 includes a processor 451, an LCD or display 452, a liquid presence sensor input 453, thermistor inputs 454, fan fail sensor input 455, heartbeat Tx/Rx input/output 456, LEDs 457, reflection sensor circuit 458, and tamper switch 459. The processor 451 can be included in a package or board with other components, such as a graphics processor/accelerator, a floating-point processor/accelerator, a controller or a microcontroller, memory (e.g., RAM, ROM, etc.), and inputs and/or outputs (e.g., Ethernet, HDMI, USB, wireless (e.g., 802.11 and/or Bluetooth)). In some embodiments, the processor 451 is a BeagleBone Black system-based chip (SBC), available from BeagleBoard.org Foundation of Oakland Township, Mich.

The liquid presence sensor input 453, thermistor inputs 454, and fan fail sensor input 455 are in electrical communication (e.g., via a bus) with a corresponding sensor 460. In other words, liquid presence sense input 453 is in electrical communication with liquid presence sensor 463, thermistor inputs 454 are in electrical communication with respective thermistors 464, and fan fail sensor input 455 is in electrical communication with fan fail sensor 465. The processor 451 is configured to monitor the liquid presence sense input 453, thermistor inputs 454, and fan fail sensor input 455 to determine if there is a change in state of the input signal, which may indicate a change in state of the corresponding sensor 460. For example, a change in state of the input signal at the liquid presence sensor input 453 can indicate that the liquid presence sensor 463 senses liquid (e.g., inside the RAU cabinet). A change in state of the input signal at the thermistor inputs 454 can indicate an increase or decrease in temperature of the RAU 400 and/or the temperature of the utility/electrical closet in which RAU 400 is located. A change in state of the input signal at the fan fail sensor input 455 can indicate that the cooling fan for the RAU 400 has failed.

If a change in state of one or more of the input signals is detected, the processor 451 can illuminate or change the color of one or more corresponding LEDs 457. In addition or in the alternative, the processor 451 can generate an alert message to send to a server or a remote-monitoring computer over VPN 494. LEDs 457 can also indicate the status of RAU 400, the status of one or more of the DRCs 410, 412, 414, 416, and/or the existence of a fault (e.g., the activation of tamper switch 459).

The processor 451 uses heartbeat Tx/Rx input/output 456 to send and receive a test signal to test the functionality of the ARC 40. The test signal is broadcast by the antennas 490 in the building for a predetermined time period (e.g., 10 seconds) to confirm that the RF repeaters 470, 472 and the antennas 490 are functioning adequately.

The reflection sense circuit 458 is in electrical communication with RF power meter 488, which measures the RF power reflected by the RF power meter 388. High reflected RF power can indicate that one or more antennas 490 have failed.

The DCAM/RCAM logic board 450 also monitors (e.g., constantly or periodically monitors) for SNMP alarms sent over Ethernet from the repeaters 470, 472 and the rectifier 480. The DCAM/RCAM logic board 450 processes those alarms and displays those alarms and/or additional conditions such as AC Power Failure and a Low Battery condition on LCD 452.

Any of the foregoing sensed or detected information (e.g., the output of sensors 460, the status of RAU 400, the status of one or more of the DRCs 410, 412, 414, 416, the output of the reflection sense circuit 458, the output of tamper switch 459, etc.) can be displayed on LCD 452 and/or can be sent to a server or a remote-monitoring computer over network 494. LCD 452 can also display additional status/alarm conditions from internal or external sensors.

The rectifier 480 converts input AC power (e.g., 120V AC 15A as illustrated in FIG. 4) to DC power. The converted DC power is then distributed to the interconnect boards 440, 442, 444, 446, and the DCAM/RCAM logic board 450.

The RCAM logic board 450DRC Control and Monitoring Module (DCAM) 210

Figure 6:
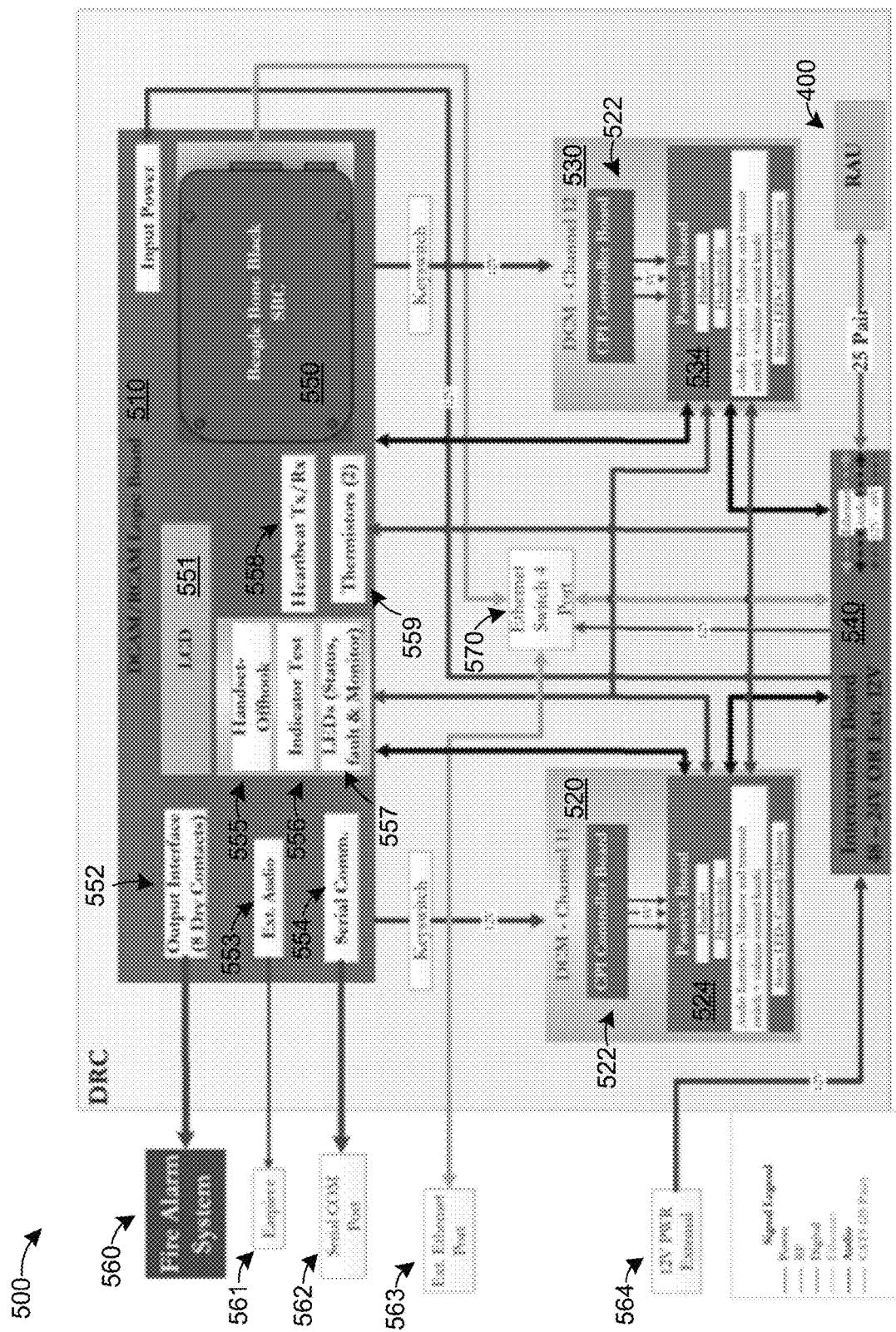
FIG. 6 is a block diagram of a dispatch radio console according to one or more embodiments.

FIG. 6 is a block diagram of a DRC 500 according to one or more embodiments. DRC 500 can be the same as or substantially the same as one or more of DRCs 410, 412, 414, 416. DRC 500 includes a DCAM/RCAM logic board 510, first and second DCMs 520, 530, and an interconnect board 540.

The DCAM/RCAM logic board 510 can be disposed in DCAM 210 (FIG. 2). The DCAM/RCAM logic board 510 includes a processor 550, an LCD or display 551, an output interface 552, an external audio interface 553, a serial communication interface 554, a handset off-hook monitor 555, an indicator test 556, LEDs 557, heartbeat Tx/Rx input/output 558, and thermistors 559. The processor 550 can be the same as, substantially the same as, or different than processor 451, discussed above. The output interface 552 is in electrical communication with the fire alarm system 560 of the building. The external audio interface 553 is in electrical communication with earpiece 561, which includes a speaker and/or a microphone. Serial communication interface 554 is in electrical communication with serial communication port 562, which can be connected to an external device or sensor in some embodiments. The serial communication port 562 can allow for testing and/or control of the processor 550. The handset off-hook monitor 555 lights a panel-mounted LED (e.g., LEDs 557) when the handset is lifted off hook. Indicator test 556 is a button (e.g., a push button) on the DCAM/RCAM logic board 510 that "tests" all LEDs 557 by illuminating them simultaneously when the button is pressed/activated.

The display 551 can be the same as or different than status and alarm display 213. In addition or in the alternative, LEDs 557 can be the same as or different than channel 11 key switch indicator LED 212, fault indicator LED 214, and/or channel 12 key switch indicator LED 217.

LEDs 557 can indicate the status of DRC 500, the status of RAU 400, whether any faults have been detected, and/or the status of something being monitored (e.g., input power). Heartbeat Tx/Rx input/output 558 can be used to monitor the communication status between DRC 500 and RAU 400 by sending and receiving signals (e.g., every second) to/from RAU 400. Thermistors 559 are used to monitor the temperate of the DCAM/RCAM logic board 510.

Each DCM 520, 530 includes a respective controller board 522, 532 (e.g., available from CPI Communications of Wylie, Tex.), and a passive board 524, 534. The controller board 522 can be the same as control board 710 (FIGS. 3B, 3C). The passive board 524, 534 can be the same as interface board 842 (FIG. 3B). Each passive board 524, 534 includes a handset interface, a hook switch interface, audio interfaces, and status LEDs. The handset interface is in electrical communication with a handset (e.g., a speaker and microphone) to provide input and output signals to/from the handset. The hook switch interface monitors the handset to determine whether the handset is off hook. The output of the hook switch interface is provided to handset off-hook monitor 555. The audio interfaces include a monitor switch, a transmit LED, and a volume control input such as a volume control knob. The monitor switch removes the CTCSS allowing receipt of weaker signals that are below the squelch threshold. The transmit LED indicates when an RF repeater (e.g., RF repeaters 470, 472) is transmitting on that channel. The status LEDs can indicate the status of the respective channel. The passive boards 524, 534 are in electrical communication with each other (via digital lines) and with DCAM/RCAM logic board 510 (via digital and audio lines). Each DCM 520, 530 receives power from DCAM/RCAM logic board 510 via a respective power line, which is in electrical communication with a respective key switch (e.g., key switches 211, 216). The key switch allows for independent activation of either or both DCMs 520, 530. Until the key switch is turned "on" (e.g., by turning a key, such as a fire department of New York (FDNY) "citywide elevator" key), the associated DCM(s) 520, 530 is/are in standby mode and is/are inactive.

Interconnect board 540 is in electrical communication with DCAM/RCAM logic board 510, RAU 400, DCMs 520, 530, Ethernet switch/port 570, and external power source 564. Interconnect board 540 receives power from external power source 564 and/or from RAU 400 (over CAT5 cable 430 or 432) and provides electrical power to DCAM/RCAM logic board 510 and Ethernet switch/port 570. External power source 564 can be a DC power source (e.g., a 12V DC power source), such as one or more batteries. Interconnect board 540 is in electrical (e.g., audio data) communication with passive boards 524, 534 on respective DCMs 520, 530. Interconnect board 540 is also in electrical communication with Ethernet switch/port 570. Ethernet switch/port 540 is in electrical communication with external Ethernet port 563, processor 550, and interconnect board 540. A computer (e.g., a laptop) can connect to DRC 500 and RAU 400 for maintenance or diagnostics by plugging an Ethernet cable into the computer and the external Ethernet port 563. This can make it easier for a technician to communicate with RAU 400, which can be located in the building's basement which is less accessible.

FIGS. 7-12 are circuit diagrams of one or more circuits that can be included in DCAM/RCAM logic board 450 and/or DCAM/RCAM logic board 510.

The present disclosure should not be considered limited to the particular embodiments described above. Additional modifications, equivalent processes, as well as numerous structures to which the present disclosure may be applicable, will be readily apparent to those skilled in the art to which the present disclosure is directed upon review of the present disclosure.

Those skilled in the art will appreciate the many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various one or more of the aspects described above. In some embodiments, computer readable media may be non-transitory media.

The terms "program" and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An auxiliary radio communications apparatus comprising:
a common logic board comprising:
a microprocessor;
a plurality of sensor inputs in electrical communication with the microprocessor; and
a display screen in electrical communication with the microprocessor;
a common interconnect board that receives first and second communication signals, the common interconnect board in electrical communication with the common logic board;
a network switch in electrical communication with the common interconnect board to provide remote access to the auxiliary radio communications apparatus;
a first RF repeater in electrical communication with the common interconnect board and with the common logic board, the first RF repeater receiving the first communication signals from the common interconnect board; and
a second RF repeater in electrical communication with the common interconnect board and with the common logic board, the second RF repeater receiving the second communication signals from the common interconnect board,
wherein:
the first RF repeater retransmits the first communication signals to a plurality of antennas to broadcast over a first communication channel, and
the second RF repeater retransmits the second communication signals to the plurality of antennas to broadcast over a second communication channel.

2. The apparatus of claim 1, wherein:
the first RF repeater retransmits the first communication signals to a first dispatch control module that includes a first handset; and
the second RF repeater retransmits the second communication signals to a second dispatch control module that includes a second handset.

3. The apparatus of claim 2, wherein the first and second dispatch control modules are disposed in a common dispatch radio console.

4. The apparatus of claim 1, further comprising a plurality of thermistors and wherein the plurality of sensor inputs includes thermistor inputs, the thermistor inputs receiving output signals from the plurality of thermistors.

5. The apparatus of claim 1, further comprising a liquid presence sensor and wherein the plurality of sensor inputs includes a liquid presence sensor input, the liquid presence sensor input receiving an output signal from the liquid presence sensor.

6. The apparatus of claim 1, further comprising a fan fail sensor in electrical communication with a cooling fan, and wherein the plurality of sensor inputs includes a fan fail sensor input, the fan fail sensor input receiving an output signal from the fan fail sensor.

7. The apparatus of claim 1, wherein the logic board includes an RF power reflection sense circuit in electrical communication with an RF power meter.

8. The apparatus of claim 7, wherein the RF power meter is in electrical communication with at least one of the antennas.

9. The apparatus of claim 1, wherein:
the common interconnect board receives first handheld radio communication signals from a first antenna,
the first RF repeater retransmits the first handheld radio communication signals to the antennas, to broadcast over the first communication channel, and to a first dispatch control module,
the common interconnect board receives second handheld radio communication signals from a second antenna, and
the second RF repeater retransmits the second handheld radio communication signals to the antennas, to broadcast over the second communication channel, and to a second dispatch control module.

10. The apparatus of claim 9, wherein the first and second dispatch control modules are disposed in a common dispatch radio console.

11. The apparatus of claim 1, further comprising a rectifier that converts an input AC power to an output DC power, the output DC power output electrically coupled to the common interconnect board, to the first and second RF repeaters, and to the logic board.

12. The apparatus of claim 1, wherein the common interconnect board is a first common interconnect board and the apparatus further comprises a second common interconnect board that receives third and fourth communication signals, the second common interconnect board in electrical communication with the common logic board and with the first and second RF repeaters, wherein
the first RF repeater retransmits the third communication signals to the antennas to broadcast over the first communication channel, and
the second RF repeater retransmits the fourth communication signals to the antennas to broadcast over the second communication channel.

13. The apparatus of claim 1, wherein the common logic board further comprises a heartbeat monitor that sends a test signal to the first and second RF repeaters and to the antennas to test the apparatus.

14. An auxiliary radio communications system comprising:
a dispatch radio console comprising first and second dispatch control modules, the first dispatch control module including a first handset that sends and receives first communication signals, the second dispatch control module including a second handset that sends and receives second communication signals;
a plurality of antennas;
a radio amplification unit comprising:
a common RAU logic board comprising:
a microprocessor; and
a display screen in electrical communication with the microprocessor;
a common RAU interconnect board that receives first and second communication signals, the common RAU interconnect board in electrical communication with the RAU logic board;
a first RF repeater in electrical communication with the common RAU interconnect board and with the RAU logic board;
a second RF repeater in electrical communication with the common RAU interconnect board and with the RAU logic board; and
a network switch in electrical communication with the common RAU interconnect board to provide remote access to the radio amplification unit and the dispatch radio console,
wherein:
the first RF repeater retransmits the first communication signals to the antennas and to the first dispatch control module,
the second RF repeater retransmits the second communication signals to the antennas and to the second dispatch control module, and
the antennas broadcast the first and second communication signals over the first and second communication channels, respectively.

15. The system of claim 14, wherein the dispatch radio console further comprises:
a DRC logic board that includes a microprocessor, the DRC logic board in electrical communication with the first and second dispatch control modules; and
a DRC interconnect board in electrical communication with the common RAU interconnect board, the DRC logic board, and the first and second dispatch control modules.

16. The system of claim 15, wherein each of the first and second dispatch control modules includes a controller board and a passive board.

17. The system of claim 16, wherein each passive board includes:
a handset interface in electrical communication with the corresponding handset to provide and receive input and output signals, respectively;
a hook switch interface in electrical communication with the corresponding handset to receive an off-hook signal when the handset is off hook;
audio interfaces including a monitor-and-transmit switch and a volume controller; and
status lights that indicate a status of the corresponding communication channel.

18. The system of claim 17, wherein the DRC logic board further includes a handset off-hook monitor in electrical communication with the hook switch interface and with an off-hook status light.

19. The system of claim 15, wherein the DRC logic board further includes a heartbeat monitor that communicates with the radio amplification unit to test the dispatch radio console.

20. The system of claim 15, wherein the DRC interconnect board and the common RAU interconnect board are electrically coupled by a cable disposed in a pathway having at least a 2-hour fire rating.

21. The system of claim 14, wherein the RAU logic board further comprises a heartbeat monitor that sends a test signal to the first and second RF repeaters and to the antennas to test the apparatus.

22. The system of claim 14, wherein the RAU logic board further comprises an RF power reflection sense circuit in electrical communication with an RF power meter, the RF power meter in electrical communication with at least one of the antennas.

23. The system of claim 14, wherein:
the common RAU interconnect board receives first handheld radio communication signals from a first antenna,
the first RF repeater retransmits the first handheld radio communication signals to the plurality of antennas and to the first dispatch control module,
the RAU interconnect board receives second handheld radio communication signals from a second antenna,
the second RF repeater retransmits the second handheld radio communication signals to the plurality of antennas and to the second dispatch control module, and
the antennas broadcast the first and second handheld radio communication signals over the first and second channels, respectively.

24. The system of claim 14, wherein the common RAU interconnect board is a first RAU interconnect board and the apparatus further comprises a second RAU interconnect board that receives third and fourth communication signals, the second RAU interconnect board in electrical communication with the RAU logic board and with the first and second RF repeaters, wherein
the first RF repeater retransmits the third communication signals to the antennas,
the second RF repeater retransmits the fourth communication signals to the antenna, and
the antennas broadcast the third and fourth communication signals over the first and second channels, respectively.

25. The system of claim 14, wherein the first and second channels correspond to first and second radio frequency pairs, respectively.

* * * * *